Patented Apr. 18, 1950

2,504,133

UNITED STATES PATENT OFFICE 2,504,133

METHOD OF PREPARING FOUNDRY SANDS

William Worley Kerlin, Cleveland Heights, Ohio, assignor to Meehanite Metal Corporation, a corporation of Tennessee No Drawing. Application March 22, 1947, Serial No. 736,596

2 Claims. (Cl. 22—217)

My invention relates to foundry practice in general, and more particularly to molding sand compositions for foundry use.

An object of my invention is to provide an improved foundry sand.

Another object of my invention is to provide an improved foundry sand which may be reproduced accurately in any given location.

Specifically, the object of the present invention is to provide an inorganic bond for a foundry sand mix addable to the sand mix in the form of a thixotropic gel, to thereby provide constant contraction-expansion characteristics for a particular blend of sand and bonding material.

Other objects and a fuller understanding of my invention may be had by referring to the following description and claims.

Almost every foundry has developed special mixtures of sand and clay with other special ingredients for their particular use. Prior to the present invention, these sand mixtures were all developed by empirical means, but seldom is it possible for one foundry mixture to be applied in another foundry with complete success because of (a) variables in methods of mixing and mixing equipment, (b) variables in raw material such as sand, clays and the like, and (c) differences in contour, section and the resulting heat influence from castings made in various foundries. These conditions are inherent in the industry and must be recognized in any process which is to have wide application.

After an extended study of mold failures causing fissures, buckles, scars and metal penetration, I have come to the conclusion that the principal cause of these failures must be the differential between the expansion of the sand and the contraction of the clay bond as the moisture is driven from the mixture during the baking process, or during the metal casting process. However, whether my hypothesis as to the reason be correct or not, I have found a way to successfully overcome the difficulty previously inherent and seemingly uncontrollable in foundry sand mixes, and it is this improved sand mixture and the method of providing the sand mixture which is the fundamental concern of the present description.

Generally, my invention comprises the mixing of a suitable sand with an organic binding material and clay materials or other special ingredients in the dry stage, and thereafter tempering the dry sand mix with a clay slurry of a suitable clay holding water mechanically within the cell structure. Some materials have the power to hold a definite amount of water by a loose bond, and is known as water of crystallization. Other materials hold a predetermined definite amount of water in their mechanical structure and form a gel. Clay is such a material. The clay will hold a definite amount of water in its physical structure, and no more. More water will be excess and simply thin the gel to a solution.

The publication "Petroleum Technology," vol. 1, No. 1, 1938, discusses this phenomenon to some extent. There it is said that when clay and water are shaken together and thereafter allowed to stand, a clay gel will settle out. The system is referred to as a thixotropic system, and therefore, one may well refer to the gel portion as a thixotropic gel. Although this term will be referred to hereinafter to designate the gel intended, nevertheless, it is understood that the gel is one which holds water within its mechanical or physical structure, not in true chemical combination, but having no water in excess of that held by the gel as a part of the gel. In other words, all water is mechanically held in the physical structure of the clay. For example, the molecular structure of clay resembles tiny flakes or plates. When water is added these flakes move away from each other and water takes its place between the flakes. The clay thus swells similar to the way the various folds of an accordion expands. The comparative ability of the various types of clay to absorb water in this manner is determined by the relative thickness of the flakes and the amount of water that is able to position itself between the flakes. In forming the thixotropic gel, a suitable clay and water are violently agitated together and allowed to stand for a few hours to become stable. The clay selected, and the amount of water used, must be such that all of the water is held as a thixotropic gel.

A montmorillonite type of clay, for example, the clay commonly referred to as the southern bentonite clay, will break up into a large number of extremely minute flakes. The great number of water films between flakes indicates that the order of plasticity will be high. The huge surface area for the development of water films also indicates that water of plasticity and drying shrinkage will be relatively high. Bonding power in green sand mixture will also be high. Western bentonite also belongs to this group, but a slight difference in the molecular structure enables the western bentonite clay particles to sub-divide to an almost infinite degree. A solution of as much as 98 per cent water will not separate out into the jelly-like mass characteristic of most clay. Such a thin solution does not have much practical use as bonding agents because the viscosity becomes too low to bond the sand grains.

The illite group of clays have a much thicker clay flake, and accordingly the amount of actual mineral in comparison to the water which may be held between the flakes is relatively great. The plasticity of such clays is relatively less than the southern bentonite type. However, the drying shrinkage would be somewhat lower in the illite group, but the green bonding strength is sacrificed to some extent.

The kaolinite group clays include the china clays and has the largest clay particle in relation to the water film between the particles. That is, there are fewer clay particles in a given volume of suspensoid and consequently fewer water films between the flakes. Accordingly, the plasticity of this type of clay is much lower than the other two types described. Nevertheless, the water held between the flakes of clay is described as being in the thixotropic condition. It is the water between the clay flakes which is said to be in a thixotropic condition, and this water content can be accurately determined per volume of thixotropic gel for any given clay material. If a greater amount of water than the thixotropic amount be added to the clay, it will be free water and indeterminate in the clay mix. It is this free water that apparently has caused molding failures prior to the present discovery.

The comparison of the various clays and their ability to hold water in the thixotropic condition may be done by shaking a quantity of clay with an excess of water and allowing the clay to settle for a period of time. The clay will allow the full capacity of thixotropic water to penetrate between its flakes in this period of time, and will settle to the bottom of the jar and form a jelly-like liquid with a supernatant solution of clear water above. The amount of water held by the clay is governed by the physical structure of the clay. As before indicated, western bentonite clay will sub-divide to such an extent that only 2 per cent of the clay with water will not settle out. Therefore, a comparison of other clays with bentonite after the various clays are shaken with water and allowed to settle, will indicate settling in all of the jars except the western bentonite jar.

By adding about 20 per cent western bentonite with any of the other types of clays, it will readily be seen that a clay slurry will be produced having a characteristic compounded of the two types of clay. That is, if a kaolinite group, say china clay, were mixed with western bentonite in the ratio of 80 per cent china clay to 20 per cent bentonite, a jelly-like slurry would result primarily from the gel nature of the china clay, but all of the water would be held in the thixotropic condition because of bentonite present. There would be no free water in such a slurry.

In the foundry-man's jargon, wetting of the dry sand mix is calling tempering. In the practice of my invention, I employ a 100 per cent thixotropic gel for tempering of the dry sand mix. I need not necessarily alter specific ratios of ingredients which have been found to be suitable for a particular use. I do, however, add the moisture normally used for tempering in a new and improved manner. I add the water as a thixotropic gel in all instances, and never add it as free water. Although I am not certain of the reason why this step is so entirely important, I do believe the thixotropic gel allows the moisture and the clay to be evenly distributed about the individual sand particles evenly throughout the dry sand mix, and prevents the concentration of moisture in one part of the dry sand mix to the exclusion of another part. A gel will distribute itself throughout the mix much more satisfactorily than plain water. Thus, when the foundry-man tempers his dry sand mix in my improved manner, one portion of the mix will be like any other portion rather than spotty as when using a hose or watering can to apply free water. In such practice of adding free water, after the foundry-man has tested a portion of the sand and found it to be of the right moisture content, a thorough examination of the entire mix will reveal some parts to be muddy and other parts to be inadequately wetted.

Furthermore, when making up a new sand mix, I discourage the practice of mixing the clay material which is intended to be the bonding agent of the mixture, into the dry sand mix, and thereafter tempering the dry sand mix with a thin suspensoid of bentonite clay. In such practice, the clay materials in the dry sand mix will be rather thoroughly distributed, and the water and the thin bentonite slurry will unite with the clay material somewhat during the five-minute mulling step, but the time is not sufficient for the clay material to really absorb the water as it ought to be absorbed into its structure in a thixotropic condition, and furthermore, some of the moisture will be used in wetting the sand directly rather than uniting with the clay. Thus, even if a very good dry mixture of the sand with the clay could be accomplished, the time element will not be sufficient to allow the clay material to become jelly-like in nature and surround the sand particles. Such surrounding of the individual sand particles is quite easily accomplished in a very short period of time by the use of thixotropic gel.

As before stated, it is not my intention primarily to alter all sand mixes to a given basic formula. On the contrary, any formula which has been developed for suitable hot strength, or for suitable green strength, or for any other particular characteristic desired may be prepared by my improved method. However, when making up new sand mixes, or in adapting the known sand mixes for general use throughout the industry, some slight alteration of the expansion and contraction characteristics of the mix is oftentimes necessary. In the early part of this description, it was shown how various types of clay were able to hold various amounts of water as thixotropic water. When the clay held a large amount of thixotropic water, the contraction of the clay upon heating was relatively great. Conversely, when the amount of water held was relatively low the contraction under heat was found to be relatively low. This same characteristic has been found to be true with such materials as silica flour, zirconium flour, and basic electric furnace slags. These materials are able to hold a certain amount of water in their molecular structure, but not as much water as clay. Therefore, it is possible to blend various types of clay, and such materials as the silica flour, zirconium flour and basic electric furnace slags, and other such type materials together with bentonite to produce a slurry which will contract under heat in amounts substantially equal to the expansion of the sand and other ingredients of the dry sand mix. In order to more clearly set forth my invention, a specific example will be given. This example, it is emphasized, is only an example of the principle, and is not intended to be a limitation of the invention. Also, it is not intended that any specific type of clay, or any specific amount of clay or other material be held as the broad invention in producing the thixotropic gel. The basic invention resides principally in the concept of producing a gel to serve as an inorganic binder for a sand mix and having a contraction characteristic suitable to substantially balance the expansion of the sand mixture making up the main body of the complete mix, and also in the holding of all water in this slurry in the thixotropic condition, and using only the thixotropic gel to temper the dry sand mix. Specific formula developments must be relegated to the position of sub-generic inventions. The following is a typical example:

1. Mix a bentonite-china clay slurry as follows:
   (a) Mix dry, 3.6 parts western bentonite with 32.3 parts by weight of pulverized china clay.
   (b) Add above, slowly, to 64.2 parts by weight of water while in violent agitation.
   (c) Solution is usually allowed to stand for 12 hours, or more, to become stable.
2. Dry a #80 washed and graded Jersey Silica sand with 90% of the grains through the 50 mesh and above the 140 mesh screens.
   (a) Add 88.7 parts sand and 2.2 parts by weight of dextrine to the muller and mix dry.
   (b) An auxiliary ingredient such as iron oxide ($Fe_2O_3$) may or may not be added in amounts up to 2% by weight. This is to facilitate the peeling of the sand from the casting.
3. Mix 91 parts of the number 2 mixture with 9 parts by weight of the slurry described in No. 1. Mull together for approximately 5 minutes more or less.
4. The mold or core is rammed up as hard as possible, and if the part is to be baked, the baking is done at 350–400° F. in the usual manner. Time of drying is determined by the size of the mold.
5. Surface of mold is brushed one or more times with a good commercial mold wash and thoroughly dried. Surface is lightly sandpapered between coats to give maximum smoothness to the surface of the mold.
6. Mold is assembled and cast in usual way, using due precautions to avoid the introduction of dirt and slag with the metal.

As a comparison of my improved method with a sand mix prepared by the former method, I submit the following three examples:

Table A

|  | 1 | 2 | 3 |
|---|---|---|---|
|  | Pounds | Pounds | Pounds |
| Silica sand | 200 | 200 | 200 |
| Silica flour | 5.5 |  |  |
| Western bentonite | 1.5 |  | 1.7 |
| Goose Lake Clay |  | 22 | 15.8 |
| Cereal flour binder | .9 | .9 | .9 |
| Dextrine | 2.6 | 2.6 | 2.6 |

The flour and dextrine binders were used to give additional dry strength to the mold which was to be made. The silica flour-bentonite combination and the various clay mixtures were added to the sand mixture in the form of slurries and uniform distribution was insured by mulling. The relation of the tempering water to the mixture as a whole is illustrated below.

Table B

|  | 1 | 2 | 3 |
|---|---|---|---|
|  | Per Cent | Per Cent | Per Cent |
| Water content based on total sand | 5.2 | 5.2 | 4.5 |
| Water content based on gel content | 63 | 34 | 36 |
| Capacity of gel to hold water | 85 | 13 | 70 |

A brief explanation of the mix No. 1 will suffice to illustrate all three of the examples. It was found that approximately 10½ pounds of water in the form of a thixotropic gel would be sufficient to completely temper the dry ingredients listed in Table A. 10½ pounds of water amounts to substantially 5.2% by weight of water. The method of determining the amount of water in a thixotropic gel is to mix intimately 10% of dry solids to be tested with 90% by weight of water and allow it to settle for one week in sealed containers. The supernatant liquid is then removed and the moisture content of the residue is determined. By this method, the 5½ pounds of silica flour and 1½ pounds of western bentonite, which are the material in the first example made into a slurry according to the teaching of this invention, are determined to be capable of holding 85% water as a gel. In other words, 85 parts of water to 15 parts of the silica flour and bentonite. However, the 10½ pounds, or 5.2% water actually needed to temper the dry sand mix amounted to only 63% water content based on gel content. In other words, not only was all of the water held as a thixotropic gel, but a margin of safety in the order of 22% under the maximum ability of the material to form a thixotropic gel has been allowed. There is absolutely no danger here of having any free water present in the mixture if the thixotropic gel is made in accordance with the teaching of this invention.

Although it is not good practice to do so even with my improved sand mix, in actual foundry practice employees will often be inclined to add free water to the sand mix in spite of instructions to the contrary. I have found that the margin of safety provided, for example the 22% of the first mix, will permit a quantity of water to be added without fatal consequences. That is, after having properly mixed a sand batch according to the teachings of my invention, and providing the actual water content based on gel content is less than the capacity of gel to hold water, a certain amount of free water may be sprinkled upon the sand heap and this water will be instantly absorbed by the gel surrounding the sand particles and thus prevent most of the failures usually resulting from the addition of free water to the sand. Thus, sand mix made according to the teaching of my invention also provides a safety factor, although it is not normally advisable to add the water directly to the sand mix.

The Example No. 2, it will be noted, has been made with Goose Lake clay, which is a kaolinite or refractory clay. As previously explained, the kaolinite group will hold very little water as a thixotropic gel in comparison with the illite or montmorillonite type clay. Accordingly, the 22 pounds of Goose Lake clay used were determined to be able to hold a maximum of 13% water as a thixotropic gel. However, the amount of water actually required is 34%. Therefore, the maximum limit has been exceeded by 21%. This excess water is all in the form of free water. If only 13% water were used in Example 3, not enough moisture would be present to properly temper the sand. On the other hand, if enough water were added, it would be free water, because the clay can only hold a given amount of water. This free water is the troublemaker. On the other hand, if additional slurry were added until the mix were suitably moist, then the clay content would be too high.

Example No. 3, it will be seen, employs bentonite in addition to Goose Lake clay and is able to hold 70% water in a thixotropic condition. As a comparison, only 36% water is actually required in Example No. 3 to temper the dry sand mix. Accordingly, Example No. 3 will be found to resist failures.

Molds 6" x 6" x 6" were made from these three mixtures and poured with the same molten metal. The casting made in the molds using mixtures Nos. 1 and 3 were substantially perfect, whereas the casting made with a mold using mixture No. 2 was badly scarred and would be rejected as a bad casting.

After the sand made in accordance with the principles of my invention has been used and in contact with molten metal for a period of time, the bentonite clay becomes burned out and rendered ineffective for its purpose. The refractory clays will remain coated about the individual grains of the sand and other materials in the sand mix substantially as they were placed by the gel, and the burned out bentonite will remain there also. I have found, therefore, that after a clay has been properly made in accordance with the teachings of this invention, and after the bentonite has been burned out of the mix by contact with molten metal, the bentonite may be replaced by making a thin suspension of the bentonite with water. It is of course acceptable that new sand could be made and used for each mold, but this is financially out of the question, and the sand mix must necessarily be rejuvenated. My improved sand mix may be rejuvenated as described, and approaches very nearly to, if not equal to, the characteristics of the original new mix. This step must not be confused with prior practices of tempering the original sand mix with the thin bentonite slurry in making the original sand. It is not a substitute for the original step, but it is a permissible rejuvenation step after the original sand mix has been properly prepared. The addition to a bentonite slurry, or combination of clays as a slurry is not the concept to be grasped in understanding this invention, but the concept to be grasped is the proper distribution of moisture in clays by the production of a thixotropic gel in the original sand mix.

Although I have described my invention with a certain degree of particularity in its preferred form, it is understood that the present disclosure of the preferred form has been made only by way of example, and that numerous changes in the details of construction and the combination and arrangement of parts may be resorted to without departing from the spirit and the scope of the invention as hereinafter claimed.

What is claimed is:

1. The process of preparing a foundry mold material, comprising the steps of separately preparing a slurry by mixing 3.2 parts by weight western bentonite clay with 32.3 parts by weight of pulverized china clay, adding slowly 64.2 parts by weight of water to the mixed western bentonite clay and china clay, and thereafter violently agitating the clay and water mixture together and then allowing the mixture to stand and stabilize for a period of time, separately preparing a suitable foundry sand base material, and finally thoroughly mixing together 91 parts by weight of the dry mix with 9 parts by weight of the slurry.

2. The method of compounding a foundry mold material, comprising the steps of providing a suitable foundry sand base material, and adding tempering moisture and bonding agents as a gel having at least about 34% of water mechanically entrained and having no free water, said bonding agents being a mixture of western bentonite and other gel forming agent material.

WILLIAM WORLEY KERLIN.

REFERENCES CITED

The following references are of record in the file of this patent:

UNITED STATES PATENTS

| Number | Name | Date |
|---|---|---|
| 1,657,573 | Hanley | Jan. 31, 1928 |
| 1,770,686 | DeWitt | July 15, 1930 |
| 2,180,897 | Dunbeck | Nov. 21, 1939 |
| 2,230,939 | Dunbeck | Feb. 4, 1941 |
| 2,348,155 | Shanley | May 2, 1944 |
| 2,389,541 | Pavlish | Nov. 20, 1945 |

OTHER REFERENCES

Transactions Am. Foundryman's Assoc., vol. 49 (1941), pages 141–155.